US008972800B2

(12) United States Patent
Zhang et al.

(10) Patent No.: US 8,972,800 B2

(45) Date of Patent: Mar. 3, 2015

(54) SYSTEMS AND METHODS FOR ENHANCED MEDIA DEFECT DETECTION

(75) Inventors: Fan Zhang, Milpitas, CA (US); Weijun Tan, Longmont, CO (US); Ming Jin, Fremont, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 162 days.

(21) Appl. No.: 13/561,243

(22) Filed: Jul. 30, 2012

(65) Prior Publication Data

US 2014/0032982 A1 Jan. 30, 2014

(51) Int. Cl.
*G06F 11/07* (2006.01)

(52) U.S. Cl.
USPC .......................................................... 714/47.2

(58) Field of Classification Search
CPC . G06F 11/0754; G06F 11/16; G01R 33/1207; G11B 20/10287; G11B 20/10296; G11B 20/18
USPC .......................................................... 714/1–57
See application file for complete search history.

(56) References Cited

U.S. PATENT DOCUMENTS 5,802,069 A 9/1998 Coulson
6,065,149 A 5/2000 Yamanaka
6,301,679 B1 10/2001 Tan
6,446,236 B1 9/2002 McEwen et al.
6,557,113 B1 4/2003 Wallentine
6,691,263 B2 2/2004 Vasic et al.
6,697,977 B2 2/2004 Ozaki
6,731,442 B2 5/2004 Jin et al.
6,738,948 B2 5/2004 Dinc et al.
6,980,382 B2 12/2005 Hirano et al.
7,154,936 B2 12/2006 Bjerke et al.
7,168,030 B2 1/2007 Ariyoshi
7,203,015 B2 4/2007 Sakai et al.
7,237,173 B2 6/2007 Morita et al.
7,254,192 B2 8/2007 Onggosanusi et al.
7,257,172 B2 8/2007 Okamoto et al.
7,359,313 B2 4/2008 Chan et al.
7,441,174 B2 10/2008 Li et al.
7,457,212 B2 11/2008 Oh
7,466,782 B1 * 12/2008 Patapoutian ................. 375/355
7,652,966 B2 1/2010 Kadokawa
7,688,915 B2 3/2010 Tanrikulu et al.
7,702,973 B2 4/2010 Mead et al.
7,849,385 B2 12/2010 Tan et al.
7,852,722 B2 12/2010 Kikugawa et al.
7,924,518 B2 4/2011 Mathew et al.
7,952,824 B2 5/2011 Dziak et al.

(Continued)

FOREIGN PATENT DOCUMENTS

EP 0549151 6/1993
EP 1096491 10/2005

(Continued)

OTHER PUBLICATIONS

Bagul, Y.,G.: "Assessment of current health and remaining useful life of hard disk drives" [online] Jan. 1, 2009 [retrieved on Oct. 14, 2010] Retrieved from the internet:<URL;htt.

(Continued)

*Primary Examiner* — Nadeem Iqbal
(74) *Attorney, Agent, or Firm* — Hamilton DeSanctis & Cha

(57) ABSTRACT

Various embodiments of the present invention provide systems and methods for media defect detection.

20 Claims, 4 Drawing Sheets

(56) References Cited

U.S. PATENT DOCUMENTS

| | | | | |
|---|---|---|---|---|
| 8,054,717 | B1 * | 11/2011 | Yang et al. | 369/47.14 |
| 8,094,396 | B1 * | 1/2012 | Zhang et al. | 360/31 |
| 8,095,855 | B2 | 1/2012 | Tan et al. | |
| 8,121,224 | B2 | 2/2012 | Tan et al. | |
| 8,139,457 | B2 | 3/2012 | Cao et al. | |
| 8,149,527 | B2 * | 4/2012 | Tan et al. | 360/25 |
| 8,161,357 | B2 | 4/2012 | Tan et al. | |
| 8,176,400 | B2 | 5/2012 | Tan et al. | |
| 8,190,831 | B2 | 5/2012 | Lee et al. | |
| 8,201,051 | B2 | 6/2012 | Tan et al. | |
| 8,219,892 | B2 | 7/2012 | Tan et al. | |
| 8,274,871 | B2 * | 9/2012 | Xia et al. | 369/53.17 |
| 2002/0041459 | A1 | 4/2002 | Singer | |
| 2002/0139191 | A1 * | 10/2002 | Hedeen et al. | 73/593 |
| 2003/0043487 | A1 | 3/2003 | Morita et al. | |
| 2003/0147172 | A1 | 8/2003 | Singer et al. | |
| 2007/0061687 | A1 | 3/2007 | Hwang | |
| 2009/0268848 | A1 * | 10/2009 | Tan et al. | 375/316 |
| 2010/0042877 | A1 * | 2/2010 | Tan | 714/704 |
| 2010/0229031 | A1 | 9/2010 | Tan | |
| 2010/0268996 | A1 | 10/2010 | Yang | |
| 2010/0269023 | A1 | 10/2010 | Yang | |
| 2011/0205653 | A1 * | 8/2011 | Mathew et al. | 360/31 |
| 2011/0209026 | A1 | 8/2011 | Xia | |
| 2012/0087033 | A1 | 4/2012 | Yang | |
| 2012/0113782 | A1 * | 5/2012 | Xia et al. | 369/53.17 |
| 2012/0254679 | A1 | 10/2012 | Tan | |
| 2012/0266055 | A1 | 10/2012 | Zhang | |

FOREIGN PATENT DOCUMENTS

| | | |
|---|---|---|
| JP | 10-145243 | 5/1998 |
| JP | 2007-087529 | 4/2007 |
| WO | WO 01/39188 | 5/2001 |

OTHER PUBLICATIONS

ECMA: Standardizing Information and Communication Systems: “Standard ECMA-272: 120 mm DVD Rewritable Disk (DVD-RAM)” Standard ECMA, No. 272, Feb. 1, 1998 pp. 43-51.

Galbraith et al, “Iterative Detection Read Channel Technology in Hard Disk Drives” [online] Oct. 1, 2008 [ret. on Oct. 1, 2008] Ret. from Internet<URL:http://www.hitachigst.com.

Kavcic et al., “A Signal-Dependent Autoregressive Channel Model”, IEEE Transactions on Magnetics, vol. 35, No. 5, Sep. 1999 pp. 2316-2318.

U.S. Appl. No. 13/551,523, filed Jul. 17, 2012, Ming Jin, Unpublished.

U.S. Appl. No. 13/558,228, filed Jul. 25, 2012, Weijun Tan, Unpublished.

U.S. Appl. No. 13/547,516, filed Jul. 12, 2012, Jefferson E. Singleton, Unpublished.

U.S. Appl. No. 13/525,194, filed Jun. 15, 2012, Bruce Wilson, Unpublished.

U.S. Appl. No. 13/459,289, filed Apr. 30, 2012, Fan Zhang, Unpublished.

U.S. Appl. No. 13/452,722, filed Apr. 20, 2012, Shaohua Yang, Unpublished.

U.S. Appl. No. 13/213,789, filed Aug. 19, 2011, Ming Jin, Unpublished.

U.S. Appl. No. 13/368,599, filed Feb. 8, 2012, Yang Cao, Unpublished.

* cited by examiner

SYSTEMS AND METHODS FOR ENHANCED MEDIA DEFECT DETECTION

BACKGROUND OF THE INVENTION

The present inventions are related to systems and methods for transferring information, and more particularly to systems and methods for determining problems related to a medium.

Various data transfer systems have been developed including storage systems that transfer information via a medium. In some cases, the medium is damaged, and processes are used to detect damage to the medium. As one example, during manufacture of a storage system methodical testing of the medium is employed to identify defective regions and map those defective regions such that they are not used. During operation, additional damage to the medium may occur and needs to be detected. In some cases, a media defect detector is used to detect the occurrence of a defect on the medium. Existing approaches may not properly detect or characterize defects leading to performance problems.

Hence, for at least the aforementioned reasons, there exists a need in the art for advanced systems and methods for defect detection.

BRIEF SUMMARY OF THE INVENTION

The present inventions are related to systems and methods for transferring information, and more particularly to systems and methods for determining problems related to a medium.

Various embodiments of the present invention provide data processing systems that include a medium from which a data set is accessible, and a multi-pass defect detector circuit. The multi-pass defect detector circuit includes a defect quality characterization circuit and a threshold comparison circuit. The defect quality characterization circuit is operable to determine a defect amplitude based upon two or more accesses of the data set from a location on the medium identified as potentially defective. The threshold comparison circuit is operable to compare the defect amplitude with a threshold value to yield a defect indication.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS OF THE INVENTION

Figure 1:
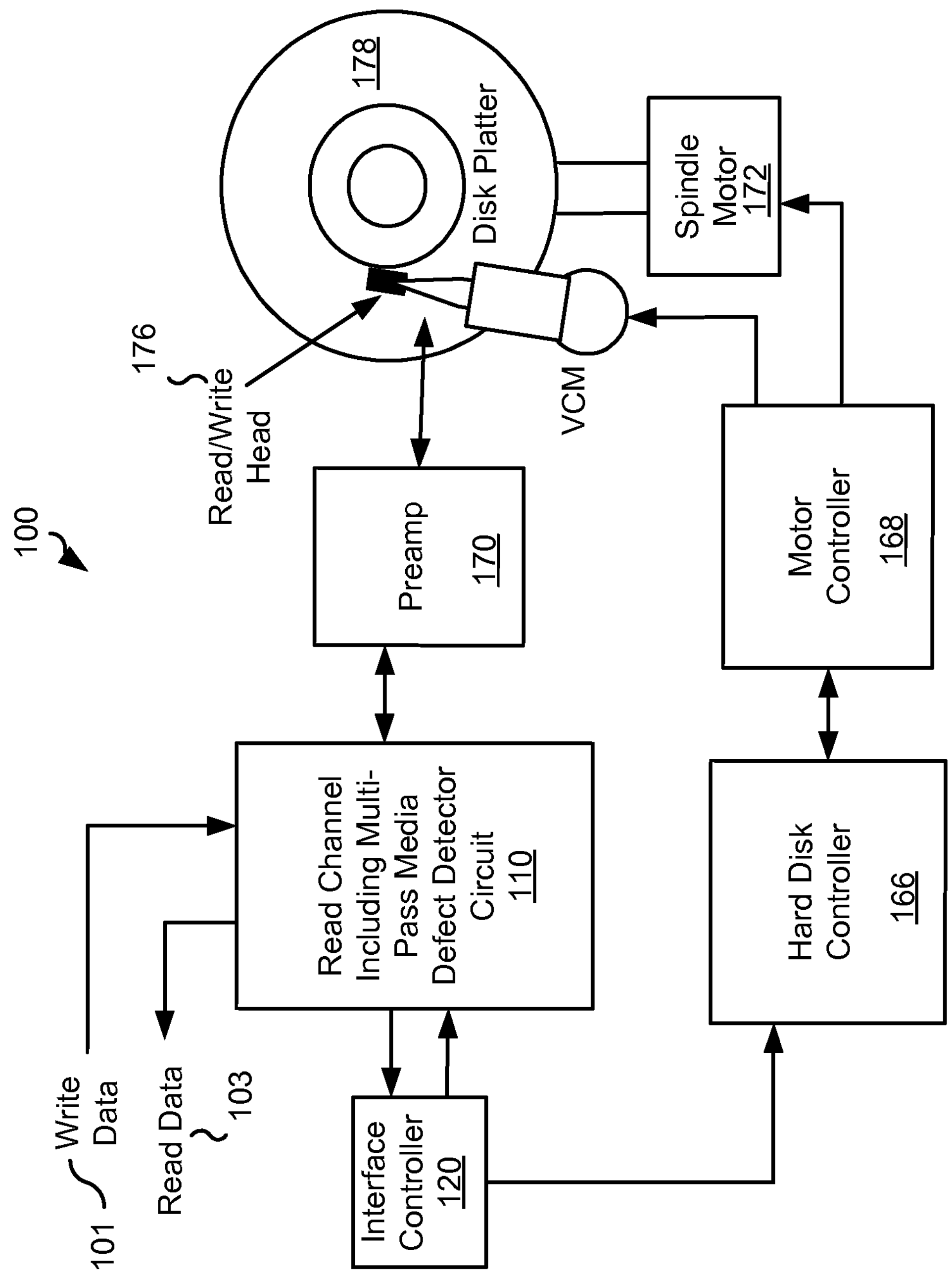
FIG. 1 shows a storage system including a read channel with a multi-pass media defect detector circuit in accordance with various embodiments of the present invention.

The present inventions are related to systems and methods for transferring information, and more particularly to systems and methods for determining problems related to a medium.

Various embodiments of the present invention provide for data processing systems that include media defect detection circuitry. The media defect detection circuitry receives data derived from a medium and determines whether that data indicates a defect on the medium corresponding to the location from which the data was derived. Where a media defect is indicated, it is averaged in with previous defects from the same area, and the averaged value is compared to a threshold value to determine whether the defect is significant enough to warrant additional processing. The threshold value may be a fixed value or it may be a user programmable value set to a level to appropriately identify defects. Where the defect is determined to be significant enough to warrant additional processing, the soft data from a data detector circuit corresponding to the data derived from the defective region may be scaled such that the probability that the data is not correctly detected is increased.

Various embodiments of the present invention provide data processing systems that include a medium from which a data set is accessible, and a multi-pass defect detector circuit. The multi-pass defect detector circuit includes a defect quality characterization circuit and a threshold comparison circuit. The defect quality characterization circuit is operable to determine a defect amplitude based upon two or more accesses of the data set from a location on the medium identified as potentially defective. The threshold comparison circuit is operable to compare the defect amplitude with a threshold value to yield a defect indication. The threshold value may be, for example, a fixed threshold value or a user programmable threshold value.

In some instances of the aforementioned embodiments, determining the defect amplitude based upon two or more accesses of the data set includes incorporating a data amplitude corresponding to a current access of the data set into a running average of data amplitudes corresponding to one or more previous accesses of the data set. In some such instances, the defect detector circuit further includes a defect memory operable to store the running average of data amplitudes corresponding to the one or more previous accesses of the data set in relation to the location on the medium identified as potentially defective. In particular cases, the defect memory is further operable to store a number of times a potential defect was identified in relation to the location on the medium identified as potentially defective.

In various cases, the defect quality characterization circuit is further operable to initialize storage in the defect memory corresponding to the location on the medium identified as potentially defective where the location on the medium identified as potentially defective is not included in the defect memory. In some such cases, the defect quality characterization circuit is further operable to delete the storage in the defect memory corresponding to the location on the medium identified as potentially defective where a defined number of accesses of the data set are not identified as corresponding to a potentially defective region of the medium. In various instances of the aforementioned embodiments, the defect detector circuit further includes a media defect detector circuit operable to identify the location on the medium as potentially defective based at least in part on the data set.

In some instances of the aforementioned embodiments, the data processing system further includes a data detector circuit and a data decoder circuit. The data detector circuit is operable to apply a data detection algorithm to a detector input derived from the data set to yield a detected output. The data decoder circuit is operable to apply a data decode algorithm to a decoder input derived form the detected output to yield a decoded output. In some cases, the decoder input derived from the detected output is a scaled version of the detected output, wherein the scaling is governed based at least in part on the defect indication.

Other embodiments of the present invention provide methods for data processing that include: receiving a data set from a location on a storage medium; applying a media defect detection algorithm by a media defect detector circuit to the data set to identify a potential defect at the location on the storage medium; incorporating an amplitude value corresponding to an amplitude of the data set at the location on the storage medium with an average of amplitude values calculated from amplitude values of the data set previously accessed from the location on the storage medium to yield an updated average; and comparing the updated average with a threshold value to yield a defect indication.

Turning to FIG. 1, a storage system 100 including a read channel circuit 110 having a multi-pass media defect detector is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103.

As part of processing data accessed from disk platter 178, read channel circuit 110 performs a media defect detection process operable to determine whether received data is associated with a defective region of disk platter 178. Where a defect is detected, the amplitude of the data received from the defective region is averaged with preceding data from the same region. This running average of data from the same region reduces sensitivity to one time anomalies. The resulting averaged data is compared against a threshold value. Where the averaged data is less than the threshold value, a defect is declared and soft data from a data detector circuit corresponding to the defective region is degraded to increase the possibility that data corresponding to the defective region will be changed during subsequent processing through a data decoder circuit and the data detector circuit. In some embodiments of the present invention, the data processing circuit including the multi-pass media defect detector circuit may be implemented similar to that discussed below in relation to FIG. 2, and/or may apply data processing similar to that discussed below in relation to FIGS. 3*a*-3*b*.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
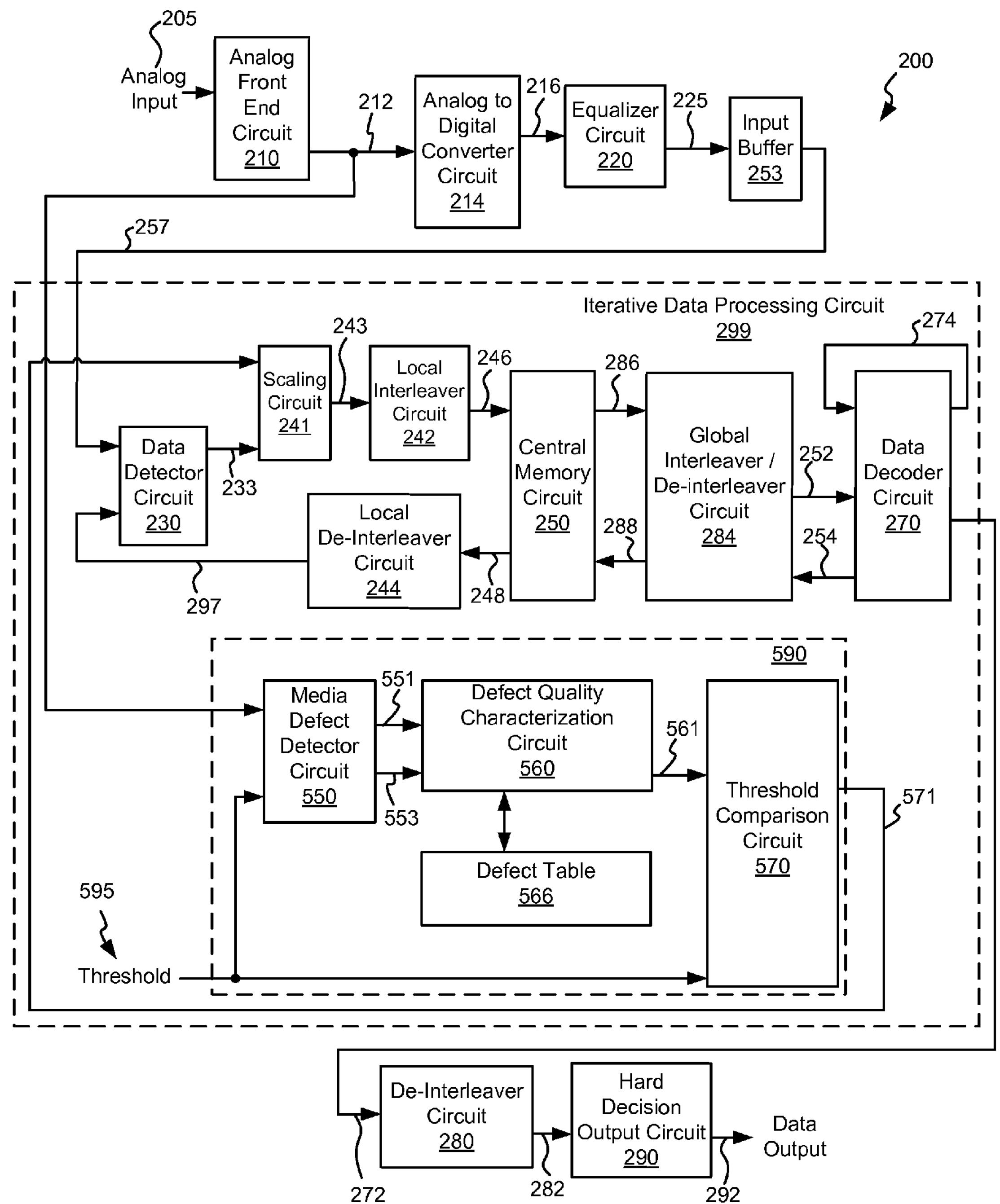
FIG. 2 depicts a data processing circuit including a multi-pass media defect detector circuit in accordance with various embodiments of the present invention.

Turning to FIG. 2, a data processing circuit 200 including a multi-pass media defect detector circuit 590 in accordance with various embodiments of the present invention. Multi-pass media defect detector circuit 590 includes a media defect detector circuit 550, a defect quality characterization circuit 560, and a threshold comparison circuit 570. Defect quality characterization circuit 560 utilizes a defect table 566. Data processing circuit 200 includes an analog front end circuit 210 that receives an analog signal 205. Analog front end circuit 210 processes analog signal 205 and provides a processed analog signal 212 to an analog to digital converter circuit 214. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog signal 205 is derived from a read/write head assembly (not shown) that is disposed in relation to a storage medium (not shown). Based upon the disclosure provided herein, one of ordinary skill in the art will recognize a variety of media from which analog signal 205 may be derived.

Analog to digital converter circuit 214 converts processed analog signal 212 into a corresponding series of digital samples 216. Analog to digital converter circuit 214 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 216 are provided to an equalizer circuit 220. Equalizer circuit 220 applies an equalization algorithm to digital samples 216 to yield an equalized output 225. In some embodiments of the present invention, equalizer circuit 220 is a digital finite impulse response filter circuit as are known in the art. It may be possible that equalized output 225 may be received directly from a storage device in, for example, a solid state storage system. In such cases, analog front end circuit 210, analog to digital converter circuit 214 and equalizer circuit 220 may be eliminated where the data is received as a digital data input.

Equalized output 225 is stored to an input buffer 253 that includes sufficient memory to maintain one or more codewords until processing of that codeword is completed through an iterative data processing circuit 299 (outlined by dashed lines) including, where warranted, multiple global iterations (passes through both a data detector circuit 230 and a data decoder circuit 270) and/or local iterations (passes through data decoder circuit 270 during a given global iteration). An output 257 is provided to data detector circuit 230

Data detector circuit 230 may be a single data detector circuit or may be two or more data detector circuits operating in parallel on different codewords (i.e., data sets). Whether it is a single data detector circuit or a number of data detector circuits operating in parallel, data detector circuit 230 is operable to apply a data detection algorithm to a received codeword or data set. In some embodiments of the present invention, data detector circuit 230 is a Viterbi algorithm data detector circuit as are known in the art. In other embodiments of the present invention, data detector circuit 230 is a maximum a posteriori data detector circuit as are known in the art. Based upon the disclosure provided herein, one of ordinary skill in the art will recognize a variety of data detector circuits that may be used in relation to different embodiments of the present invention. In some cases, one data detector circuit included in data detector circuit 230 is used to apply the data detection algorithm to the received codeword for a first global iteration applied to the received codeword, and another data detector circuit included in data detector circuit 230 is operable apply the data detection algorithm to the received codeword guided by a decoded output accessed from a central memory circuit 250 on subsequent global iterations.

Upon completion of application of the data detection algorithm to the received codeword (i.e., processing data input) on the first global iteration, data detector circuit 230 provides a detected output 233. Detected output 233 includes soft data (La). As used herein, the phrase "soft data" is used in its broadest sense to mean reliability data with each instance of the reliability data indicating a likelihood that a corresponding bit position or symbol has been correctly detected. In some embodiments of the present invention, the soft data or reliability data is log likelihood ratio data as is known in the art. Detected output 233 is provided to a local interleaver circuit 242 via a scaling circuit 241. Scaling circuit 241 operates to scale one or more symbols in detected output 233 corresponding to a media defect as indicated by a defect indicator 571. This scaling operates to modify soft data associated with the effected symbols of detected output 233 to reduce the probability that the symbol is considered properly found. By doing this, the likelihood that an effected symbol negatively impacts processing of the codeword is reduced and the likelihood that the symbol will be modified by later processing is increased. Scaling circuit 241 provides a scaled detected output 243 to local interleaver circuit 242. Where no defects are indicated by defect indicator 261, scaled detected output 243 is the same as detected output 233.

Local interleaver circuit 242 is operable to shuffle sub-portions (i.e., local chunks) of the data set included as detected output and provides an interleaved codeword 246 that is stored to central memory circuit 250. Interleaver circuit 242 may be any circuit known in the art that is capable of shuffling data sets to yield a re-arranged data set. Interleaved codeword 246 is stored to central memory circuit 250.

Once data decoder circuit 270 is available, a previously stored interleaved codeword 246 is accessed from central memory circuit 250 as a stored codeword 286 and globally interleaved by a global interleaver/de-interleaver circuit 284. Global interleaver/De-interleaver circuit 284 may be any circuit known in the art that is capable of globally rearranging codewords. Global interleaver/De-interleaver circuit 284 provides a decoder input 252 into data decoder circuit 270. In some embodiments of the present invention, data decoder circuit 270 is a low density parity check decoder circuit as are known in the art. Application of the data decode algorithm by data decoder circuit 270 yield a decoded output 274. In cases where the decoded output 274 fails to converge (i.e., failed to yield the originally written data set) and another local iteration (i.e., another pass through data decoder circuit 270) is desired, data decoder circuit 270 re-applies the data decode algorithm to decoder input 252 guided by decoded output 274. This continues until either a maximum number of local iterations is exceeded or decoded output 274 converges.

Where decoded output 274 fails to converge and a number of local iterations through data decoder circuit 270 exceeds a threshold, the resulting decoded output is provided as a decoded output 254 back to central memory circuit 250 where it is stored awaiting another global iteration through a data detector circuit included in data detector circuit 230. Prior to storage of decoded output 254 to central memory circuit 250, decoded output 254 is globally de-interleaved to yield a globally de-interleaved output 288 that is stored to central memory circuit 250. The global de-interleaving reverses the global interleaving earlier applied to stored codeword 286 to yield decoder input 252. When a data detector circuit included in data detector circuit 230 becomes available, a previously stored de-interleaved output 288 accessed from central memory circuit 250 and locally de-interleaved by a de-interleaver circuit 244. De-interleaver circuit 244 re-arranges decoder output 248 to reverse the shuffling originally performed by interleaver circuit 242. A resulting de-interleaved output 297 is provided to data detector circuit 230 where it is used to guide subsequent detection of a corresponding data set previously received as equalized output 225.

Alternatively, where the decoded output converges (i.e., yields the originally written data set), the resulting decoded output is provided as an output codeword 272 to a de-interleaver circuit 280. De-interleaver circuit 280 rearranges the data to reverse both the global and local interleaving applied to the data to yield a de-interleaved output 282. De-interleaved output 282 is provided to a hard decision output circuit 290. Hard decision output circuit 290 is operable to re-order data sets that may complete out of order back into their original order. Ultimately, hard decision output circuit 290 provides the converged codeword 292 as a data output to a recipient device (not shown).

Iterative data processing circuit 299 includes multi-pass media defect detector circuit 590 that operates to determine whether the received data indicates a defective storage medium from which it was derived. In particular, media defect detector circuit 550 receives processed analog signal 212 and a threshold value 595. Media defect detector circuit 550 uses the combination of processed analog signal 212 and threshold value 595 to determine whether there is a potential defect at or near the region of a medium from where the currently processing data was derived. In some cases, a defect is indicated where the amplitude of processed analog signal 212 falls below threshold 595 for a defined period. Media defect detector circuit 550 asserts a defect indicator 551 when a defect is indicated, and provides the amplitude of processed analog signal 212 as an amplitude value 553. Based upon the disclosure provided herein, one of ordinary skill in the art will recognize a variety of defect detector circuits that may be used in relation to different embodiments of the present invention. For example, defect detector circuit 550 may be implemented similar to that disclosed in U.S. patent application Ser. No. 12/527,296 entitled "Systems and Methods for Media Defect Detection" and filed Oct. 1, 2007 by Tan. The entirety of the aforementioned reference is incorporated herein by reference for all purposes.

Where defect indicator 551 is asserted, defect quality characterization circuit 560 determines whether a defect has previously been identified for the area corresponding to the currently processing data. Defect quality characterization circuit 560 reads and writes data to defect table 566 that includes a number of entries each corresponding to a location where a defect has been detected. Each entry in defect table 566 includes four entries: (1) a location on the storage medium (c1), (2) a number of times a defect has been found associated with the location (c2), (3) a running average of the amplitude values for each identified defects (c3), and (4) a number of consecutive times the region has been processed without a defect (c4).

Defect quality characterization circuit 560 compares the location of a current defect with those defects logged in defect table 566. Where the location of the current defect matches a location in one of the entries in defect table 566, then the number of times a defect has been found for that particular location is incremented (c2), amplitude value 553 is incorporated in the running average in the entry (c3), and the number of consecutive non-defect indicating reads is reset (c4). Alternatively, where the location of the current defect does not match a location in one of the entries in defect table 566, then a new entry is initialized by storing the location (c1), setting the number of times a defect has been found equal to one (c2), setting the running average equal to amplitude value 553, and (4) setting the number of consecutive non-defect indicating reads to zero (c4). Where defect indicator 551 is asserted, defect quality characterization circuit 560 provides the running average value from the entry in defect table 566 corresponding to the location as a magnitude output 561 to threshold comparison circuit 570.

Where, on the other hand, defect indicator 551 is not asserted, defect quality characterization circuit 560 determines whether a defect has previously been identified for the area corresponding to the currently processing data. Where an entry is found for the location corresponding to the currently processing data, defect quality characterization circuit 560 increments the number of consecutive non-defect indicating reads (c4) in the entry maintained in defect table 566. This number is then compared with a threshold number to determine whether the entry has existed for too long without finding a defect. Where the entry has existed too long, defect quality characterization circuit 560 deletes the entry from defect table 566.

Threshold comparison circuit 570 compares magnitude output 561 with threshold value 595. Where magnitude output 570 is less than threshold value 595, the location corresponding to the area of magnitude output 570 is identified as defect indicator 571. As discussed above, scaling circuit 241 scales any symbols in detected output 233 that correspond to defect indicator 571. This scaling operates to modify soft data associated with the effected symbols of detected output 233 to reduce the probability that the symbol is considered properly found. By doing this, the likelihood that an effected symbol negatively impacts processing of the codeword is reduced and the likelihood that the symbol will be modified by later processing is increased.

The following pseudocode describes the multi-pass defect detection applied by multi-pass media defect detector circuit 590:

```
If (magnitude of Processed Analog Signal 212 is less than Threshold 595){
  assert defect indicator 551;
  If (location of defect indicator 551 corresponds to an entry in Defect
  Table 266){
    c3 = (Amplitude Value 553 + c2*c3)/(c2+1); //calculate
    running average//
    c2 = c2 + 1;
    c4 = 0;
    Magnitude Output 561 = c3
  }
  Else { //initialize entry for the location//
    c1 = location;
    c3 = Amplitude Value 553;
    c2 = 1;
    c4 = 0
```

-continued

```
    }
}
Else {
    de-assert defect indicator 551
    If (location of defect indicator 551 corresponds to an entry in Defect
    Table 266){
        c4 = c4 +1;
        If(c4 > Threshold){
                delete entry in defect table 266
        }
    }
}
```

Figure 3A:
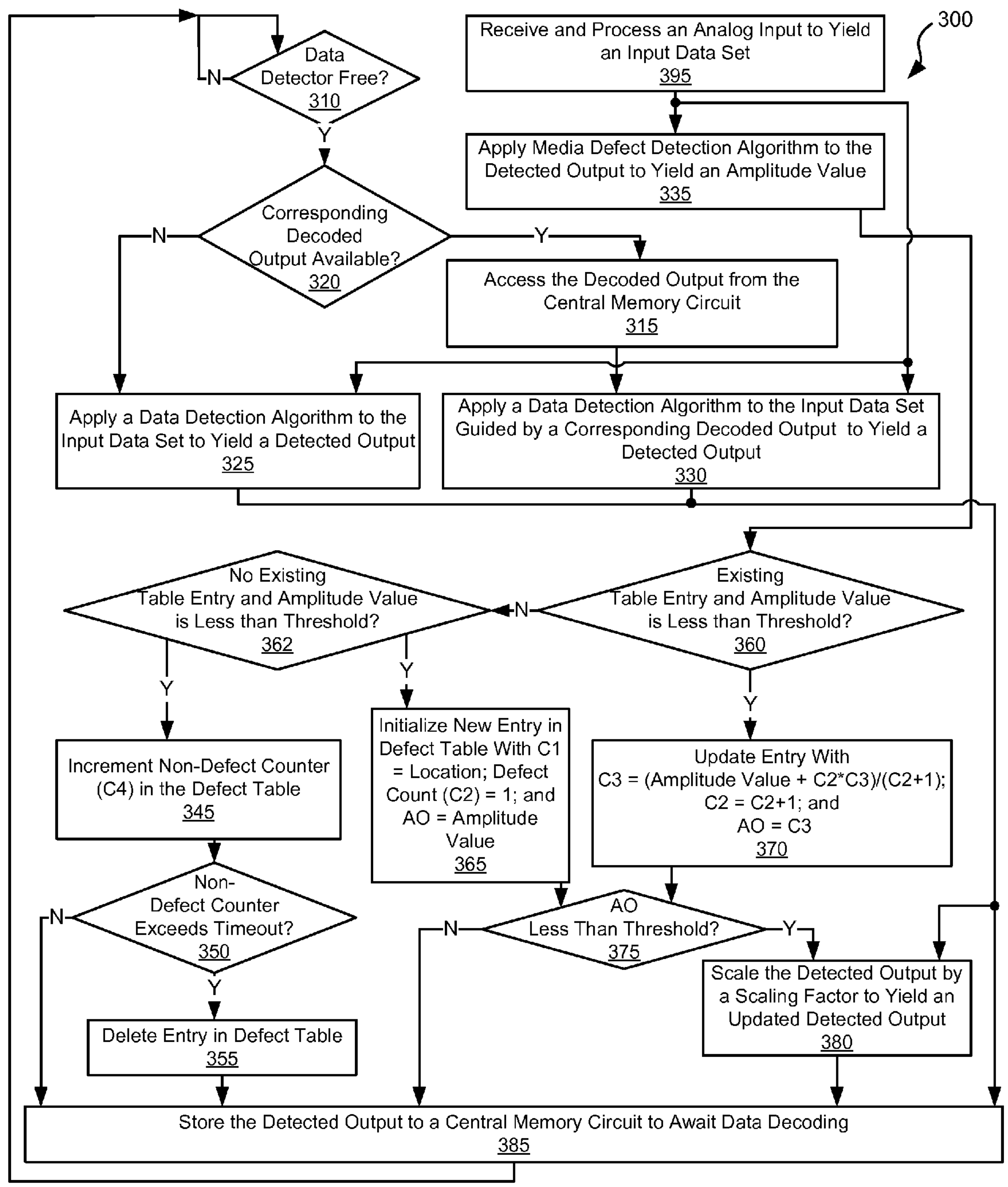
FIGS. 3*a*-3*b* are flow diagrams showing a method in accordance with some embodiments of the present invention for data processing including multi-pass media defect detection.
Figure 3B:
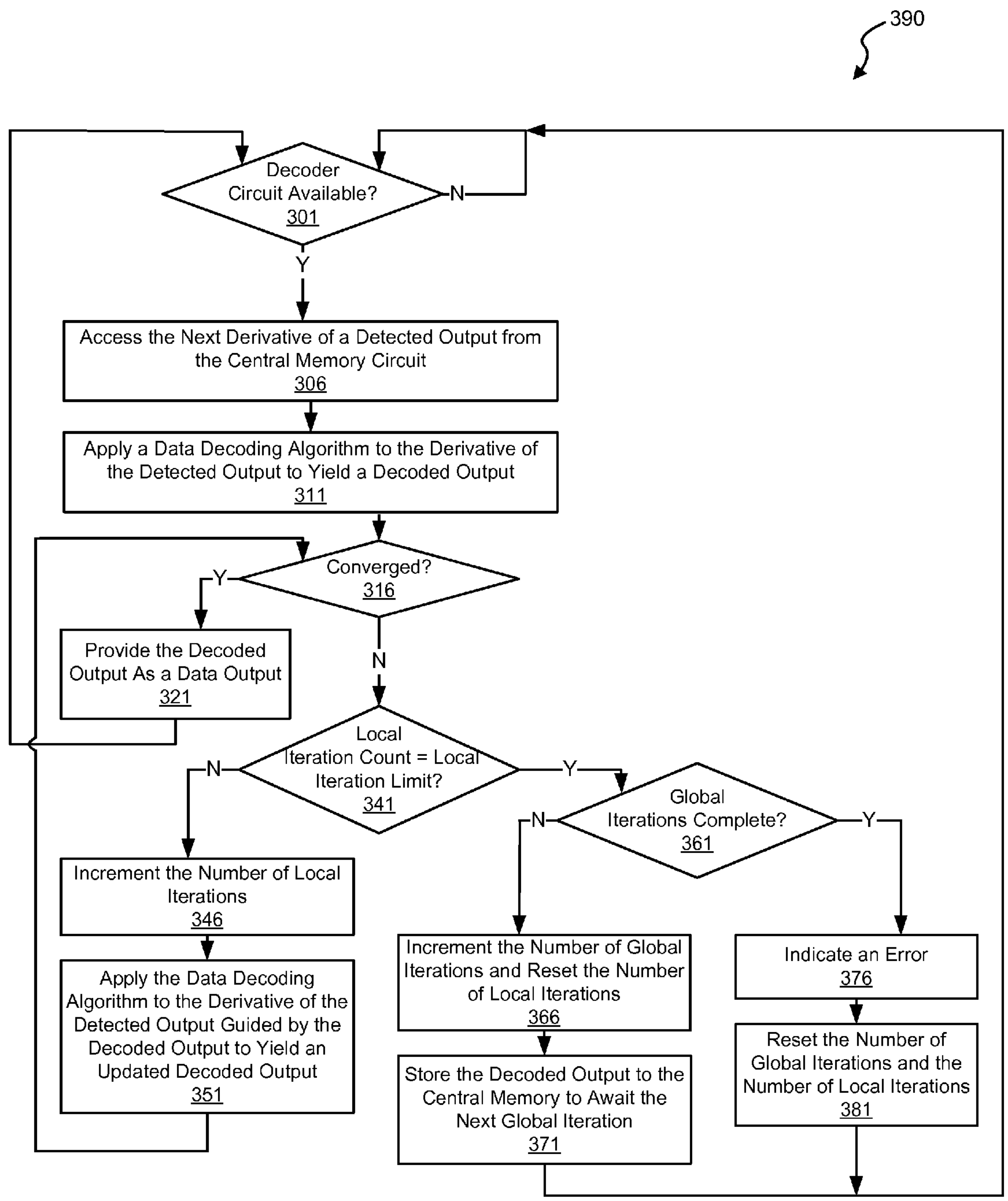

Turning to FIGS. 3*a*-3*b*, flow diagrams 300, 390 show a method in accordance with some embodiments of the present invention for data processing including multi-pass media defect detection. Following flow diagram 300 of FIG. 3*a*, an analog input signal derived from a medium is received and processed to yield an input data set (block 395). The processing may include, but is not limited to, amplification and filtering as is known in the art. A media defect detection algorithm is applied to the input data set to determine whether a potential defect exists at an area of the medium from which the input data set is derived (block 335). In addition to an indication of a media defect, application of the media defect algorithm yields an amplitude value corresponding to the amplitude of the input data set. In some cases, application of the media defect algorithm includes comparing an amplitude of the received input data set with a threshold value. Where the amplitude is less than the threshold, a potential media defect is indicated at the location from which the data is derived. Based upon the disclosure provided herein, one of ordinary skill in the art will recognize a variety of defect detector circuits that may be used in relation to different embodiments of the present invention. For example, defect detector circuit 550 may be implemented similar to that disclosed in U.S. patent application Ser. No. 12/527,296 entitled “Systems and Methods for Media Defect Detection” and filed Oct. 1, 2007 by Tan. The entirety of the aforementioned reference was previously incorporated herein by reference for all purposes.

It is determined whether a data detector circuit is available to process a newly received data set or a data set that has already been subject to one or more prior global iterations (block 310). As used herein, the phrase “global iteration” is used in its broadest sense to mean application of both a data detection algorithm and a data decode algorithm. Also, as used herein, the phrase “local iteration’ is used in its broadest sense to mean an application of the data decode algorithm. In some instances of the present invention, one or more local iterations may be performed for each global iteration.

Where a data detector circuit is available (block 310), it is determined whether a corresponding decoded output is available from a central memory circuit (block 320). Where such a corresponding decoded output is available (block 320), it is accessed from the central memory circuit (block 315) and a data detection algorithm is applied to a digital, equalized version of the input data set guided by the decoded output to yield a detected output (block 330). The data detection algorithm may be, but is not limited to, a Viterbi data detection algorithm or a maximum a posteriori data detection algorithm as are known in the art. Based upon the disclosure provided herein, one of ordinary skill in the art will recognize a variety of data detection algorithms that may be used in relation to different embodiments of the present invention. Alternatively, where a corresponding decoded output is not available from the central memory circuit (block 320), the data detection algorithm is applied to the digital, equalized version of the input data set to yield a detected output (block 325).

It is determined whether the amplitude value is less than a threshold value (i.e., indicating a potential defect) and there is an entry in a defect table corresponding to a location of the medium from which the data corresponding to the defect is derived (block 360). Where a potential defect is indicated and there is an entry corresponding to the location of the potential defect in the defect table (block 360), the entry is updated by incrementing the number of times a defect has been found for that particular location is incremented (c2), incorporating the amplitude value in a running average in the entry (c3), and resetting the number of consecutive non-defect indicating reads is reset (c4) (block 370). In addition, an amplitude output (AO) value is set equal to the running average (c3). Alternatively, where a potential defect is not indicated or there is not an entry corresponding to the location of the potential defect in the defect table (block 360), it is determined whether a potential defect is indicated and there is not an entry corresponding to the location of the potential defect in the defect table (block 362). Where a potential defect is indicated and there is not an entry corresponding to the location of the potential defect in the defect table (block 362), a new entry is initialized by storing the location (c1), setting the number of times a defect has been found equal to one (c2), setting the running average equal to the amplitude value (AO), and (4) setting the number of consecutive non-defect indicating reads to zero (c4) (block 365).

In either case, it is determined whether the amplitude output is less than a threshold (block 375). Where the amplitude output is less than the threshold (i.e., indicating a media defect) (block 375), the detected output is scaled by a scaling factor to yield an updated detected output (block 380). The updated detected output is stored to the central memory circuit to await data decoding (block 385). Otherwise, where the amplitude output is not less than the threshold (i.e., not indicating a media defect) (block 375), the detected output detected output is stored to the central memory circuit without scaling to await data decoding (block 385).

Alternatively, where a potential defect is not indicated and there is an entry corresponding to the location of the potential defect in the defect table (block 362), the non-defect counter in the entry is incremented (block 345). It is determined whether the non-defect counter exceeds a maximum number corresponding to a timeout condition (block 350). The maximum number may be user programmable. Where the timeout condition is exceeded (block 350), the entry in the defect table is deleted (block 355). In either case, the detected output is stored to the central memory circuit without scaling to await data decoding (block 385).

Following flow diagram 390 of FIG. 3*b*, it is determined whether a decoder circuit is available to process a previously stored detected output (block 301). Where the decoder circuit is available (block 301), the next derivative of a detected output is accessed from the central memory circuit (block 306), and a data decoding algorithm is applied to the derivative of the detected output to yield a decoded output (block 311). The data decoding algorithm may be, for example, a low density parity check decoding as are known in the art. Based upon the disclosure provided herein, one of ordinary skill in the art will recognize a variety of data decoding algorithms that may be used in relation to different embodiments of the present invention.

It is determined whether the data decoding process resulted in a converged output (i.e. the originally written data set) (block 316). Where the output converged (block 316), the decoded output is provided as a data output (block 321). In contrast, where the output failed to converge (block 316), it is determined if the number of local iterations of the data decoding algorithm already applied to the currently processing data set is equal to the allowable limit of local iterations (block 341). Where fewer number of local iterations than that allowed have been applied (block 341), the number of local iterations is incremented (block 346) and the data decoding algorithm is re-applied to the data set guided by the decoded output to yield an updated decoded output (block 351). The processes from block 316 are then repeated for the next local iteration.

Alternatively, where the number of allowable local iterations has been exceeded (block 341), it is determined whether a maximum number of global iterations have been applied or another timeout condition has occurred (block 361). Where the timeout condition or the maximum number of global iterations has not been exceeded (block 361), the number of global iterations is incremented and the number of local iterations is reset (block 366). The decoded output is stored to the central memory to await the next global iteration (block 371). Alternatively, where the timeout condition or the maximum number of global iterations has been exceeded (block 361), an error is indicated (block 376) and the number of global iterations and the number of local iterations are reset (block 381).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing defect detection. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing system, the data processing system comprising:

a multi-pass defect detector circuit including:

a defect quality characterization circuit operable to determine a defect amplitude based upon two or more accesses of a data set from a location on a medium identified as potentially defective; and a threshold comparison circuit operable to compare the defect amplitude with a threshold value to yield a defect indication.

2. The data processing system of claim 1, wherein the threshold value is selected from a group consisting of: a fixed threshold value, and a user programmable threshold value.

3. The data processing system of claim 1, wherein determining the defect amplitude based upon two or more accesses of the data set includes incorporating a data amplitude corresponding to a current access of the data set into a running average of data amplitudes corresponding to one or more previous accesses of the data set.

4. The data processing system of claim 3, wherein the defect detector circuit further comprises:

a defect memory operable to store the running average of data amplitudes corresponding to the one or more previous accesses of the data set in relation to the location on the medium identified as potentially defective.

5. The data processing system of claim 4, wherein the defect memory is further operable to store a number of times a potential defect was identified in relation to the location on the medium identified as potentially defective.

6. The data processing system of claim 4, wherein the defect quality characterization circuit is further operable to:

initialize storage in the defect memory corresponding to the location on the medium identified as potentially defective where the location on the medium identified as potentially defective is not included in the defect memory.

7. The data processing system of claim 6, wherein the defect quality characterization circuit is further operable to:

delete the storage in the defect memory corresponding to the location on the medium identified as potentially defective where a defined number of accesses of the data set are not identified as corresponding to a potentially defective region of the medium.

8. The data processing system of claim 1, wherein the defect detector circuit further comprises:

a media defect detector circuit operable to identify the location on the medium as potentially defective based at least in part on the data set.

9. The data processing system of claim 1, wherein the data processing system further comprises:

a data detector circuit operable to apply a data detection algorithm to a detector input derived from the data set to yield a detected output; and a data decoder circuit operable to apply a data decode algorithm to a decoder input derived from the detected output to yield a decoded output.

10. The data processing system of claim 9, wherein the decoder input derived from the detected output is a scaled version of the detected output, wherein the scaling is governed based at least in part on the defect indication.

11. The data processing system of claim 9, wherein the data decoder circuit is a low density parity check decoder circuit.

12. The data processing system of claim 9, wherein the data detector circuit is selected from a group consisting of: a Viterbi algorithm data detector circuit, and a maximum a posteriori data detector circuit.

13. The data processing system of claim 1,wherein the system is implemented as an integrated circuit.

14. The data processing system of claim 1, wherein the medium is a storage medium, and wherein the system is implemented as part of a storage device.

15. A method for data processing, the method comprising:

receiving a data set from a location on a storage medium;

applying a media defect detection algorithm by a media defect detector circuit to the data set to identify a potential defect at the location on the storage medium;

incorporating an amplitude value corresponding to an amplitude of the data set at the location on the storage medium with an average of amplitude values calculated from amplitude values of the data set previously accessed from the location on the storage medium to yield an updated average; and comparing the updated average with a threshold value to yield a defect indication.

16. The method of claim 15, the method further comprising:

applying a data detection algorithm to a detector input derived from the data set to yield a detected output; and a data decoder circuit operable to apply a data decode algorithm to a decoder input derived from the detected output to yield a decoded output.

17. The method of claim 16, wherein the decoder input derived from the detected output is a scaled version of the detected output; and wherein the scaling is governed based at least in part on the defect indication.

18. A storage device, the storage device comprising:

a storage medium operable to store a data set;

a read/write head assembly operable to sense information from the storage medium and to provide a continuous signal corresponding to the data set;

an analog to digital converter circuit operable to sample the continuous signal synchronous to a sampling clock to yield a set of digital samples;

an equalizer circuit operable to equalize the set of digital samples and to provide a corresponding symbol based output;

a defect detector circuit including:

a media defect detector circuit operable to identify a location on the storage medium as potentially defective based at least in part on the continuous signal;

a defect quality characterization circuit operable to determine a defect amplitude based upon two or more accesses of the data set from the location on the medium identified as potentially defective; and a threshold comparison circuit operable to compare the defect amplitude with a threshold value to yield a defect indication.

19. The storage device of claim 18, wherein determining the defect amplitude based upon two or more accesses of the data set includes incorporating a data amplitude corresponding to a current access of the data set into a running average of data amplitudes corresponding to one or more previous accesses of the data set.

20. The storage device of claim 18, wherein the storage device further comprises:

a data detector circuit operable to apply a data detection algorithm to a detector input derived from the data set to yield a detected output; and a data decoder circuit operable to apply a data decode algorithm to a decoder input derived form the detected output to yield a decoded output; and wherein the decoder input derived from the detected output is a scaled version of the detected output, wherein the scaling is governed based at least in part on the defect indication.

* * * * *